United States Patent [19]

Bissar

[11] 4,236,792
[45] Dec. 2, 1980

[54] ELECTROCHROMIC DISPLAY AND METHOD FOR MAKING SAME

[75] Inventor: Saadi J. Bissar, Waterbury, Conn.

[73] Assignee: Timex Corporation, Waterbury, Conn.

[21] Appl. No.: 973,832

[22] Filed: Dec. 28, 1978

[51] Int. Cl.³ .................................. G02F 1/17
[52] U.S. Cl. ...................... 350/357; 29/570; 427/77
[58] Field of Search .............. 350/357; 29/570; 427/77, 78, 108

[56] References Cited

U.S. PATENT DOCUMENTS

| | | | |
|---|---|---|---|
| 4,012,831 | 3/1977 | Leibowitz | 350/357 |
| 4,106,862 | 8/1978 | Bayard | 350/357 |

OTHER PUBLICATIONS

E. O. Brimm et al., "Sodium and Potassium Tungsten Bronzes," Journal of the American Chemical Society, vol. 73, pp. 5427-5732, Nov. 1951.

*Primary Examiner*—James W. Davie
*Attorney, Agent, or Firm*—Edward J. Timmer

[57] ABSTRACT

Disclosed is an electrochromic display having an electrolyte of optimized cationic mobility and a counter electrode of optimized electronic mobility. Preferably the display comprises (a) a front substrate with selectively actuable transparent electrodes and image-forming electrochromic layers thereon, (b) an acidified aqueous electrolyte containing a sufficient quantity of highly mobile hydrogen ions for coloration of the electrochromic layers and (c) a rear substrate spaced from the front substrate carrying a counter electrode in contact with the electrolyte, the counter electrode being in the form of a layer comprising predominantly an alkali tungsten bronze, preferably sodium and or potassium tungsten bronze, in the high temperature heat treated condition which exhibits enhanced electronic mobility. A process for making the display is also disclosed.

32 Claims, 3 Drawing Figures

ELECTROCHROMIC DISPLAY AND METHOD FOR MAKING SAME

FIELD OF THE INVENTION

The present invention relates to electrochromic displays and methods for their manufacture and, more particularly, to counter electrodes and electrolytes for use in such displays.

DESCRIPTION OF THE PRIOR ART

Electrochromic displays are well known in the art and typically comprise a front substrate with selectively actuable transparent electrodes and image-forming electrochromic layers thereon, a rear substrate spaced from the front substrate and having a counter electrode thereon and an ion-conducting electrolyte layer between the substrates. Although many electrochromic materials exist which are useful in these displays, tungsten trioxide ($WO_3$) alone or admixed with other materials is by far the most widely used. Generally, in prior art electrochromic displays, coloration of the image-forming electrochromic layers of tungsten trioxide is thought to proceed by the following reversible reaction:

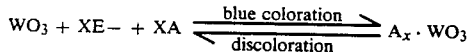

$$WO_3 + XE- + XA \underset{\text{discoloration}}{\overset{\text{blue coloration}}{\rightleftharpoons}} A_x \cdot WO_3$$

In the past, electrochromic displays have been designed to operate in two distinct modes. In one common mode, the counter electrode is constructed and conditioned by suitable treatments to function as a source or pool for cationic coloring centers, such as hydrogen ions, during operation of the display. The electrolyte employed in this type of display serves merely as a conductive path by which the cations from the counter electrode can be caused to migrate to the image-forming electrochromic layers on the front substrate by application of a suitable negative electric potential. Typical electrolytes or ion-conducting layers utilized in these types of displays include conductive pastes or gels, ion permeable membranes, ion exchange resins and the like in which the amount of water therein is restricted.

A common counter electrode employed in combination with these electrolytes comprises a layer of electrochromic material, particularly tungsten trioxide, which is precharged or pretreated to include excess hydrogen in the form of hydrogen tungsten bronze. However, metals, such as lead and palladium, and nonmetals, such as graphite, have also been employed. Typical electrochromic displays which function in this first mode, are disclosed in the Witzke patent, U.S. Pat. No. 3,840,287 issued Oct. 8, 1974; the Giglia patent, U.S. Pat. No. 3,973,829 issued Aug. 10, 1976; the Berets patent, U.S. Pat. No. 3,843,232 issued Oct. 22, 1974 and the Leibowitz patent U.S. Pat. No. 4,012,831 issued Mar. 22, 1977. In the Leibowitz patent, a mixture of tungsten oxide and sodium tungstate powder is sprayed onto a substrate and heated at a temperature between 250° C. and 1000° C. in hydrogen-bearing gas until the surface coating is converted into a brown conductive film containing excess hydrogen for coloring purposes.

In another less common mode of operation, the electrolyte provides the necessary quantity of cationic coloring centers for imparting color to the image-forming electrochromic layers while the counter electrode functions as an electronic center where electrons necessary for the aforementioned coloration reaction are supplied or exchanged. Exemplary of this type of electrochromic display is the Witzke patent, U.S. Pat. No. 3,955,879 issued May 11, 1976, in which the electrolyte is a sulfuric acid solution (about 4 molar), the counter electrode is lead (Pb) and the electrochromic layers are tungsten trioxide. Other examples possibly include the Heyman et al. patent, U.S. Pat. No. 3,981,560 issued Sept. 31, 1976 and the Zeller patents, U.S. Pat. Nos. 4,059,341 and 4,066,336 issued Nov. 22, 1977 and Jan. 3, 1978, respectively.

Other patents involving electrochromic display constructions and materials include the Kiss patent, U.S. Pat. No. 3,840,286 issued Oct. 8, 1974; the Clasen patent, U.S. Pat. No. 3,847,468 issued Nov. 12, 1974; the Berets patent U.S. Pat. No. 3,879,108 issued Apr. 22, 1975; the Giglia patent U.S. Pat. No. 3,978,007, issued Aug. 31, 1976; the Meyers patent, U.S. Pat. No. 4,006,966 issued Feb. 8, 1977; the Kasai patent, U.S. Pat. No. 4,009,936 issued Mar. 1, 1977; the Giglia patent U.S. Pat. No. 4,021,100 issued May 3, 1977; the Green patent, U.S. Pat. No. 4,060,311 issued Nov. 29, 1977 and the Meyers patent, U.S. Pat. No. 4,068,928 issued issued Nov. 29, 1977 and the Meyers patent, U.S. Pat. No. 4,068,928 issued Jan. 17, 1978 as well as others.

SUMMARY OF THE INVENTION

The present invention relates to electrochromic displays of the latter type, i.e. in which the electrolyte functions as the primary source of cationic coloring centers for the image-forming electrochromic layers and the counter electrode functions primarily as an electronic center. The invention provides such an electrochromic display in which either the cationic mobility of the electrolyte or the electronic mobility of the counter electrode or both are optimized to achieve enhanced cycling speed (coloration and bleaching cycle) and other advantages.

In a preferred embodiment of the present invention in which both the cationic mobility of the electrolyte and the electronic mobility of the counter electrode are both optimized, the electrochromic display comprises (a) a front substrate with selectively actuable transparent electrodes and image-forming electrochromic layers thereon, (b) an acidified aqueous electrolyte to provide a sufficient quantity of highly mobile hydrogen ions to the electrochromic layers to impart coloration thereto when the display is actuated and (c) a rear substrate spaced from the front substrate for carrying a counter electrode film in contact with the electrolyte, the film comprising predominantly an alkali tungsten bronze, preferably sodium and/or potassium tungsten bronze, in the high temperature heat treated condition which exhibits enhanced electronic mobility. Generally, the alkali tungsten bronze is represented by the formula $M_xWO_3$ where M is an alkali metal and X is about 0.1 to about 0.6. Tungsten trioxide may also be present in combination with the alkali tungsten bronze but the amount thereof must be sufficiently minimized to preclude harmful quantities of unstable hydrogen tungsten bronze from forming and then decomposing during manufacture and operation of the display with the release of hydrogen gas which is known to shorten the useful life of the display. Although less preferred because of their lower cationic mobility, aprotic and solid state electrolytes may also be used in combination with the heat treated alkali tungsten bronze counter electrode.

The present invention also provides a method for making a counter electrode and electrochromic display incorporating same wherein the counter electrode comprises predominantly alkali tungsten bronze with essentially no or only controlled minimized quantities of electrochromic tungsten trioxide therein. In a preferred method, a layer of tungsten trioxide is formed on a tungsten substrate and then a selected predominant portion of the tungsten trioxide is converted to alkali tungstate, preferably by reaction with sodium or potassium hydroxide, to provide a first mixture. Then, the first mixture of alkali tungstate and tungsten trioxide is heated at a sufficiently high temperature for a selected time to form a second mixture comprising substantially an alkali tungsten bronze and a minimized concentration of tungsten trioxide, the second mixture being advantageously useful, if desired, as a counter electrode. A counter electrode which is essentially free of electrochromic tungsten trioxide can be produced by subjecting the second mixture to contact with water or aqueous solutions, such as by immersion therein, in which the tungsten trioxide is soluble and dissolves and the alkali tungsten bronze is substantially insoluble. The process is particularly advantageous since not only is a counter electrode of desired composition (alkali tungsten bronze/tungsten trioxide) produced but also the alkali tungsten bronze component is placed in the high temperature heat treated condition which exhibits enhanced electronic mobility.

BRIEF DESCRIPTIONS OF THE DRAWINGS

Other features, objects and advantages of the inventions may be seen from the following description when viewed in conjunction with the accompanying drawings wherein.

DETAILED DESCRIPTION OF THE INVENTION

Figure 1:
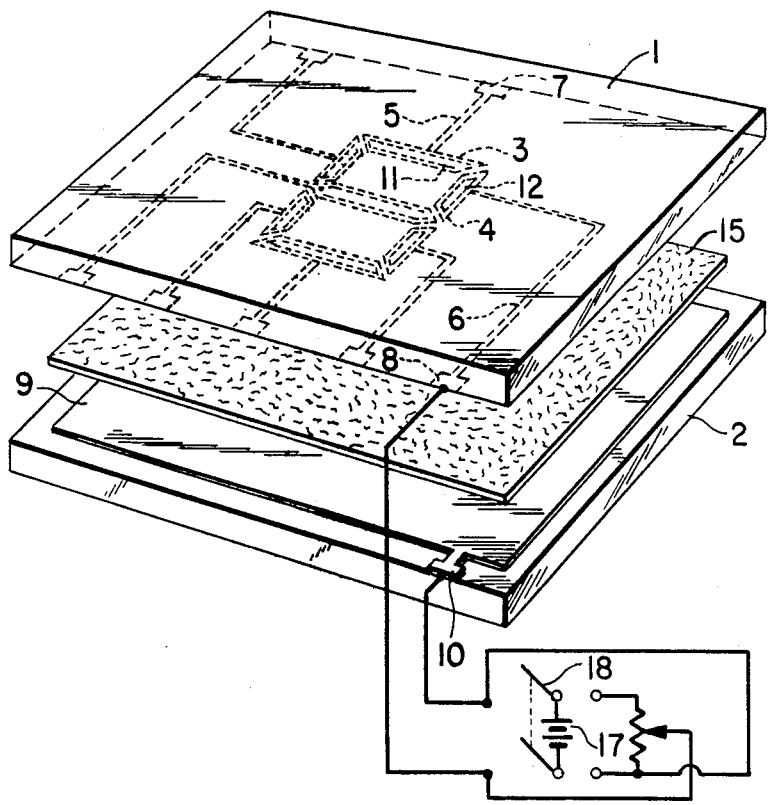
FIG. 1 is an exploded perspective view of an electrochromic display embodying the invention.

Referring now to FIG. 1 of the drawings, the electrochromic display is a sandwich construction of a first transparent substrate 1 and a second spaced substrate 2, which need not be transparent, and electrolyte layer 15 therebetween. Substrate 1 has a conductive pattern of transparent electrodes on the underside thereof such as segments 3, 4 of a pattern which can be selectively actuated to form digits or other optical patterns via conductive leads 5,6 leading to terminals 7,8. Substrate 1 may be of transparent glass or plastic with a selected pattern of transparent electrodes 3,4 thereon of a material such as, for example, tin oxide. The pattern may be etched on the substrate by using a commercially available material known as NESA glass and removing the conductive coating except for electrodes 3,4. Coated on transparent electrode segments 3,4 are layers of electrochromic material, such as tungsten trioxide ($WO_3$) indicated as 11, 12. The electrochromic layers 11, 12 are applied by suitable masking techniques to cover a smaller area than the electrodes so as to give good edge definition.

Substrate 2 may be made of glass, ceramic, plastic or preferably metal such as tungsten, and includes counter electrode 9, the composition and formation of which are described in detail hereinbelow. As shown, terminal 10 connects counter electrode 9 to the electrical circuitry of the display.

Electrolyte layer 15 may take various forms but a preferred electrolyte having optimized cationic mobility comprises acidified aqueous solutions, for example, an aqueous solution of sulfuric acid or phosphoric acid in which the acid content ranges from about 5% to 80% by volume. Dilute acid solutions are preferred since they provide increased cationic mobility (H+ mobility) for coloration purposes. Although less preferred, aprotic and solid state electrolytes may also find use in the present invention. These electrolytes are less preferred as a result of their lower cationic mobility than that of the aqueous solutions already mentioned. Exemplary of useful aprotic electrolytes are solutions of lithium salts, like $LiClO_4$ and $LiCl$, in dry organic solvents such as propylene carbonate, tetrahydrofuran and 1, 2 dimethozyethane. Solid state electrolytes useful in the invention include for example, sodium $\beta$-alumina, lithium $\beta$-alumina as well as others. In the present invention, it is the electrolyte layer 15 which functions to supply sufficient coloring agents or centers, such as H+, Li+ and the like, to electrochromic layers 11, 12 for coloring purposes. Of course, the particular type and composition of the electrolyte employed in the display can be selected to achieve the desired coloration of the electrochromic layers.

When acidified aqueous solutions are employed as electrolytes, it may be necessary to incorporate a protective membrane (not shown) between electrolyte 15 and electrochromic layers 11, 12 to inhibit or prevent their dissolution in the aqueous solution. A preferred protective membrane comprises a mixture of organic acid, preferably a polymeric acid, epoxy resin and polyamine or polyamide in prescribed portions as described more fully in copending U.S. patent application Ser. No. 973,833 filed Dec. 28, 1978, abandoned, now continuation-in-part application Ser. No. 077,863 filed Sept. 21, 1979 entitled "Protective Membrane for Electrochromic Displays" of common inventor and assignee herewith. In some situations, a porous separator sheet (not shown) may be employed as a carrier for the aqueous electrolyte solution, for example, as shown in the Leibowitz patent, U.S. Pat. No. 3,944,333 of common assignee herewith.

Figure 2:
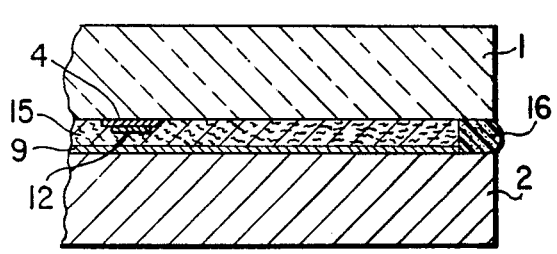
FIG. 2 is an enlarged cross-sectional view of the invention taken through an assembled display according to FIG. 1.

Reference to FIG. 2 shows the assembled display. The two substrates 1, 2 are attached to one another by an adhesive 16, such as epoxy, and the electrolyte layer is incorporated into the display in conventional manner. Then the fill hole is plugged and sealed. Suitable well-known means for actuating the display element includes means for applying an electric field from a battery 17 to a selected segment 4 via terminal 8 and the counter-electrode 9 via terminal 10. Means for reversing the polarity of the applied voltage to erase the image is indicated symbolically by a two-pole double throw switch 18.

Figure 3:
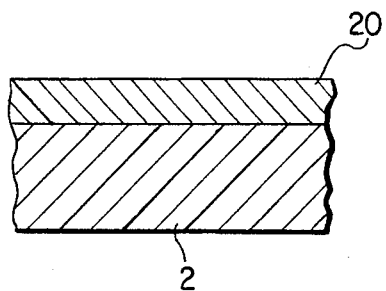
FIG. 3 is a further enlarged cross-sectional view of the counter electrode of FIG. 2.

Counter electrode 9 is shown more clearly in FIG. 3. Typically, the electrode comprises a layer 20 of high temperature heat treated alkali tungsten bronze alone or admixed with a controlled minimized content of tungsten trioxide. When made in accordance with the process to be described hereinafter, the alkali tungsten bronze is represented by the formula $M_xWO_3$ where M is an alkali metal and X is from about 0.1 to 0.6. The heat treated alkali tungsten bronze/tungsten trioxide layer 20 typically is formed from a tungsten trioxide layer deposited or formed in situ on conductive substrate 2 which is preferably a tungsten sheet or layer. The high temperature heat treated alkali tungsten bronze layer 20 functions as a highly mobile electronic center during operation of the display to supply and exchange electrons for the aforementioned coloration reaction. When employed in conjunction with the acidified aqueous electrolyte described above, the counter electrode of heat treated alkali tungsten bronze provides an electrochromic display with optimum cationic and electronic mobility, excellent switching cycles at practical voltages and long service life. By properly selecting the electrolyte layer 15 to have sufficient hydrogen ion concentration for acceptable coloration (by sufficiently minimizing or eliminating unstable hydrogen tungsten bronze from the counter electrode as a result of minimizing or eliminating tungsten trioxide) and by maintaining the X value of $H_xWO_3$ on the front substrate 1 below 0.35 (by preventing an excessive contrast ratio of the image), internal suffocation by hydrogen gas and reduction of tin oxide leads to tin metal are prevented. Thus, the need for a protective coating, such as $SiO_2$, covering the tin oxide components may not be required.

In a preferred embodiment for making the counter electrode, a layer of tungsten trioxide is first formed on the substrate 2, for example to a thickness of 0.1–250 microns. Formation of a thin tungsten trioxide layer; e.g. 0.1–1 micron, may be effected by vacuum deposition or sputtering or a thick layer e.g. 1–250 microns may be formed by surface oxidation of the substrate if a tungsten sheet or layer is employed. Layer 20 of heat treated alkali tungsten bronze with or without a controlled minimized quantity of tungsten trioxide may be produced by reacting the tungsten trioxide layer with an alcoholic solution of NaOH or KOH, preferably 0.25% by weight of the alkali hydroxide in alcoholic solution, to convert a major portion of the tungsten trioxide surface to sodium or potassium tungstate, thereby forming a first mixture. Typically, about 60 to 80 wt.% of the first mixture will comprise the tungstate compound. Thereafter, the first mixture is heated to about 800°–1000° C. for at least 2 hours in an inert atmosphere (e.g. $N_2$) followed by gradual cooling to ambient temperature to form a second mixture of predominantly sodium and/or potassium tungsten bronze and the controlled minimized content of tungsten trioxide, the reaction proceeding as follows:

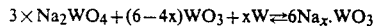

$$3 \times Na_2WO_4 + (6-4x)WO_3 + xW \rightleftharpoons 6Na_x \cdot WO_3$$

This second mixture may be utilized as the counter electrode, if desired. Typically, the quantity of tungsten trioxide permitted in the second mixture depends upon the type of electrolyte to be used. For example, with the acidified aqueous electrolytes described above, tungsten trioxide should preferably be limited to 0 to 10% by weight of the original tungsten trioxide layer. The amount of tungsten trioxide in the final mixture is controlled by the reaction conditions established in the alcoholic hydroxide treatment and the subsequent heat treatment. An even more preferred counter electrode for use with acidified aqueous electrolytes comprises heat treated alkali tungsten bronze essentially free of electrochromic tungsten trioxide. Such a counter electrode can be produced by selectively removing the tungsten trioxide from the second surface mixture formed in the preceding step. Selective removal is readily accomplished by exposing the second mixture to water or aqueous solutions since tungsten trioxide is soluble therein whereas the alkali tungsten bronze is not. A preferred technique is to immerse the heat treated layer 20 in a heated water bath. Very minor amounts of tungsten trioxide may remain in the surface layer after the leaching treatment; however, these remnants will not adversely affect the functional characteristics of the display since upon contact with the aqueous electrolyte in the display itself, the remaining tungsten trioxide will be dissolved.

While the invention has been explained by a detailed description of certain specific embodiments, it is understood that various modifications and substitutions can be made in them within the scope of the appended claims which are intended to include equivalents of such embodiments.

I claim:

1. A process for making an electrochromic display comprising the steps of:
    (a) providing a front substrate having transparent electrodes and image-forming electrochromic layers thereon;
    (b) providing a rear substrate for carrying a counter electrode, the front and rear substrates being positioned in spaced working relation;
    (c) forming a counter electrode on said rear substrate by
       1. forming a layer of tungsten trioxide on said substrate;
       2. converting a major portion of said tungsten trioxide layer to alkali tungstate to provide a first mixture of alkali tungstate and tungsten trioxide;
       3. heating the first mixture to a sufficiently high temperature for a selected time to form a second mixture comprising a major portion of alkali tungsten bronze and a controlled minor portion of tungsten trioxide, the alkali tungsten bronze being in the high temperature heat treated condition which exhibits high electronic mobility for counter electrode purposes;
    (d) filling the space between the substrates with electrolyte containing sufficient cationic coloring centers to impart coloration to said electrochromic layers; and
    (e) sealing the front and rear substrates together.

2. The method of claim 1 wherein the heat treated alkali tungsten bronze formed in step (c) (3) is represented by the formula $M_xWO_3$ where M is an alkali metal and X is from about 0.1 to about 0.6.

3. The method of claim 2 wherein said first mixture is heated to about 800° C. to about 1000° C. in step (c) (3) to form said second mixture containing alkali tungsten bronze.

4. The method of claim 2 wherein the alkali metal is selected from sodium and potassium.

5. The method of claim 1 wherein the tungsten trioxide layer is formed by vacuum deposition on a substrate.

6. The method of claim 1 wherein the tungsten trioxide layer is formed by surface oxidizing a tungsten substrate.

7. The method of claim 1 including the additional step after step (c) (3) of selectively removing said tungsten trioxide from the second mixture, leaving a layer of predominantly heat treated alkali tungsten bronze as the counter electrode.

8. The method of claim 7 wherein selective removal is effected by contacting the second mixture with water in which the tungsten trioxide is soluble and the alkali tungsten bronze is not.

9. The method of claim 1 wherein the major portion of the tungsten trioxide layer is converted to alkali tungstate by reaction with an alcoholic solution of alkali hydroxide.

10. The method of claim 9 wherein the alkali hydroxide is selected from sodium hydroxide or potassium hydroxide so that after step (c) (3) a sodium or potassium tungsten bronze remains as the counter electrode.

11. In making a counter electrode useful in electrochromic displays, the steps of:
  (a) forming a layer of tungsten trioxide by vacuum deposition on a substrate;
  (b) converting a major portion of said tungsten trioxide layer to alkali tungstate to provide a first surface mixture of alkali tungstate and tungsten trioxide;
  (c) heating the first mixture to a sufficiently high temperature for a selected time to form a second mixture comprising a major portion of alkali tungsten bronze and a controlled minor portion of tungsten trioxide, the alkali tungsten bronze being in the high temperature heat treated condition which exhibits high electronic mobility for counter electrode purposes.

12. The method of claim 11 wherein the heat treated alkali tungsten bronze formed in step (c) is represented by the formula $M_xWO_3$ where M is an alkali metal and X is from about 0.1 to about 0.6.

13. The method of claim 12 wherein said first mixture is heated in step (c) to about 800°–1000° C. to form said second mixture containing alkali tungsten bronze.

14. The method of claim 12 wherein the alkali metal is selected from sodium and potassium.

15. The method of claim 11 including the additional step after step (c) of selectively removing said tungsten trioxide from the second mixture, leaving a layer of predominantly heat treated alkali tungsten bronze as the counter electrode.

16. The method of claim 15 where selective removal is effected by contacting the second mixture with water in which the tungsten trioxide is soluble and the alkali tungsten bronze is not.

17. The method of claim 11 wherein the major portion of tungsten trioxide layer is converted to alkali tungstate by reaction with an alcoholic solution of alkali hydroxide.

18. The method of claim 17 wherein the alkali hydroxide is selected from sodium hydroxide and potassium hydroxide so that after step (c) a sodium or potassium tungsten bronze remains as the counter electrode.

19. In making a counter electrode useful in electrochromic displays, the steps of:
  (a) forming a layer of tungsten trioxide by surface oxidizing a tungsten substrate;
  (b) converting a major portion of said tungsten trioxide layer to alkali tungstate to provide a first surface mixture of alkali tungstate and tungsten trioxide;
  (c) heating the first mixture to a sufficiently high temperature for a selected time to form a second mixture comprising a major portion of alkali tungsten bronze and a controlled minor portion of tungsten trioxide, the alkali tungsten bronze being in the high temperature heat treated condition which exhibits high electronic mobility for counter electrode purposes.

20. The method of claim 19 wherein the heat treated alkali tungsten bronze formed in step (c) is represented by the formula $M_xWO_3$ where M is an alkali metal and X is from about 0.1 to about 0.6.

21. The method of claim 20 wherein said first mixture is heated in step (c) to about 800°–1000° C. to form said second mixture containing alkali tungsten bronze.

22. The method of claim 20 wherein the alkali metal is selected from sodium and potassium.

23. The method of claim 19 including the additional step after step (c) of selectively removing said tungsten trioxide from the second mixture, leaving a layer of predominantly heat treated alkali tungsten bronze as the counter electrode.

24. The method of claim 19 wherein the major portion of the tungsten trioxide layer is converted to alkali tungstate by reaction with an alcoholic solution of alkali hydroxide.

25. An electrochromic display of sandwich construction, comprising:
  (a) a front substrate with selectively actuable transparent electrodes and image-forming electrochromic layers thereon;
  (b) an electrolyte having sufficient cationic coloring centers therein to impart coloration to said layers when the display is actuated;
  (c) a rear substrate spaced from the front substrate for carrying a counter electrode layer in contact with the electrolyte, said counter electrode layer comprising a major portion of high temperature heat treated alkali tungsten broze and a controlled minor portion of tungsten trioxide, said heat treated alkali tungsten bronze functioning as a highly mobile electronic center during actuation of the display.

26. The display of claim 25 wherein the alkali tungsten bronze is heat treated to about 800° to 1000° C. and is represented by the formula $M_xWO_3$ where M is an alkali metal and X is about 0.1 to 0.6.

27. The display of claim 26 wherein the alkali metal is selected from sodium and potassium.

28. The display of claim 25 wherein the rear substrate on which the alkali tungsten bronze layer is disposed is tungsten.

29. The display of claim 25 wherein the electrolyte is an acidified aqueous solution and said counter electrode layer comprises from about 90 to 100 wt.% alkali tungsten bronze.

30. An electrochromic display of sandwich construction, comprising:
  (a) a front substrate with selectively actuable transparent electrodes and image forming electrochromic layers thereon;
  (b) an acidified aqueous electrolyte having sufficient hydrogen ion coloring centers therein to impart coloration to said electrochromic layers when the display is actuated;
  (c) a rear substrate spaced from the front substrate for carrying a counter electrode layer in contact with the electrolyte, said counter electrode layer comprising alkali tungsten bronze in the high temperature heat treated condition which exhibits high electronic mobility for counter electrode purposes.

31. The display of claim 30 wherein the alkali tungsten bronze is heat treated at about 800° to 100° C. and is represented by the formula $M_xWO_3$ where M is an alkali metal and X is about 0.1 to 0.6.

32. The display of claim 31 wherein the alkali metal is selected from sodium and potassium.

* * * * *